US012659186B1

(12) United States Patent
Link et al.

(10) Patent No.: US 12,659,186 B1
(45) Date of Patent: Jun. 16, 2026

(54) CONTROL SYSTEM HAVING INDEPENDENT COMMUNICATION NETWORKS FOR VEHICLES

(71) Applicant: Parker-Hannifin Corporation, Cleveland, OH (US)

(72) Inventors: Todd A. Link, Gray, TN (US); Kyle J. Merrill, Chuckey, TN (US); Alyn G. Brown, Nashville, IN (US); Jason S. Richardson, Chuckey, TN (US); Randall D. Thompson, Lancaster, SC (US)

(73) Assignee: Parker-Hannifin Corporation, Cleveland, OH (US)

( * ) Notice: Subject to any disclaimer, the term of this patent is extended or adjusted under 35 U.S.C. 154(b) by 93 days.

(21) Appl. No.: 18/630,057

(22) Filed: Apr. 9, 2024

Related U.S. Application Data

(60) Provisional application No. 63/503,744, filed on May 23, 2023.

(51) Int. Cl.
H04L 12/40 (2006.01)
B60K 35/21 (2024.01)
B60R 16/023 (2006.01)

(52) U.S. Cl.
CPC .............. H04L 12/40 (2013.01); B60K 35/21 (2024.01); B60R 16/023 (2013.01); H04L 2012/40273 (2013.01)

(58) Field of Classification Search
CPC .......... H04L 12/40; H04L 2012/40273; B60K 35/21; B60R 16/023
See application file for complete search history.

(56) References Cited

U.S. PATENT DOCUMENTS

| | | | |
|---|---|---|---|
| 7,254,468 B2 | 8/2007 | Pillar et al. | |
| 7,742,856 B2 | 6/2010 | Fukuta et al. | |
| 10,177,966 B2 | 1/2019 | Kurauchi et al. | |
| 11,218,309 B2 | 1/2022 | Nakagawa | |
| 11,395,458 B1 | 7/2022 | Brown et al. | |
| 2015/0214864 A1* | 7/2015 | Sopko | B60W 10/08 310/68 D |
| 2017/0288951 A1* | 10/2017 | Kurauchi | H04L 43/0811 |
| 2017/0334437 A1* | 11/2017 | Mikami | B60W 20/50 |
| 2022/0324425 A1* | 10/2022 | Kim | B60T 8/885 |

FOREIGN PATENT DOCUMENTS

CN          202175006 U          3/2012

* cited by examiner

*Primary Examiner* — Behrang Badii
(74) *Attorney, Agent, or Firm* — McDonnell Boehnen Hulbert & Berghoff LLP

(57) ABSTRACT

An example control system includes: a first communication network having a first communication bus; a second communication network having a second communication bus, independent from the first communication bus; a plurality of devices that are communicatively coupled to the first communication bus, such that each device of the plurality of devices is in direct communication with other devices of the plurality of devices, wherein the plurality of devices include: at least one drive motor controller of an electric motor that drives the vehicle, wherein the at least one drive motor controller is communicatively coupled to the first communication bus and the second communication bus; and at least one input device that commands movement of the vehicle, wherein the at least one input device is communicatively coupled directly to the at least one drive motor controller via the second communication bus.

20 Claims, 9 Drawing Sheets

400

DRIVE INPUT DEVICE 303

DISPLAY DEVICE 328

DRIVE INPUT DEVICE 305

402

302

404

DRIVE MOTOR CONTROLLER 304

302

DRIVE MOTOR CONTROLLER 306

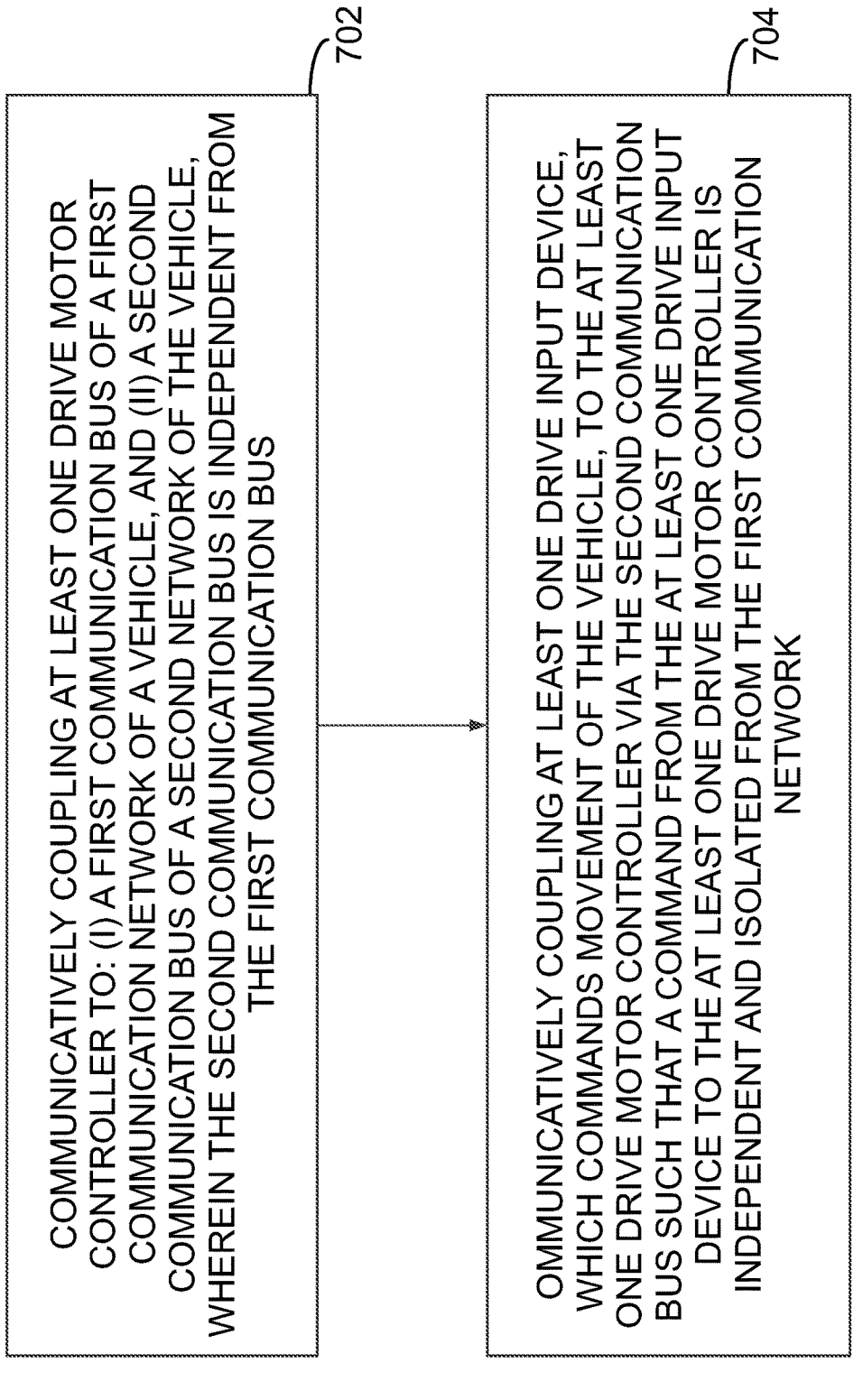

700

702

COMMUNICATIVELY COUPLING AT LEAST ONE DRIVE MOTOR CONTROLLER TO: (I) A FIRST COMMUNICATION BUS OF A FIRST COMMUNICATION NETWORK OF A VEHICLE, AND (II) A SECOND COMMUNICATION BUS OF A SECOND NETWORK OF THE VEHICLE, WHEREIN THE SECOND COMMUNICATION BUS IS INDEPENDENT FROM THE FIRST COMMUNICATION BUS

704

OMMUNICATIVELY COUPLING AT LEAST ONE DRIVE INPUT DEVICE, WHICH COMMANDS MOVEMENT OF THE VEHICLE, TO THE AT LEAST ONE DRIVE MOTOR CONTROLLER VIA THE SECOND COMMUNICATION BUS SUCH THAT A COMMAND FROM THE AT LEAST ONE DRIVE INPUT DEVICE TO THE AT LEAST ONE DRIVE MOTOR CONTROLLER IS INDEPENDENT AND ISOLATED FROM THE FIRST COMMUNICATION NETWORK

FIG.7

CONTROL SYSTEM HAVING INDEPENDENT COMMUNICATION NETWORKS FOR VEHICLES

CROSS REFERENCE TO RELATED APPLICATION

The present application claims priority to U.S. Provisional Application No. 63/503,744 filed on May 23, 2023, the entire contents of which are herein incorporated by reference as if fully set forth in this description.

BACKGROUND

Outdoor power equipment or vehicles (e.g., mowers, skid steers, etc.) may include a serial communication network having a communication bus to which various devices are connected. Such serial communication network may simplify installation, wiring, and troubleshooting of the plurality of devices that are included in the vehicle. Particularly, using a single communication network may eliminate the need for large complex wiring harnesses, and reduces direct component to component wiring.

As the number of devices (e.g., sensors, controllers, switches, etc.) on modern vehicles increases, more data is transmitted on the network communication bus. As a result, several networking-related issues such as bandwidth restrictions, prioritization of packetized information, latency, delays, and other issues can cause problems on serial networks.

There are ways to prioritize messages and manage data traffic on the network. However, potential issues still exist. For example, software can be used to determine how to handle conflicts on the network. Such software can include instructions on how to prioritize messages on the networks, and how to manage system errors and failures, for example. This may complicate the software and might not resolve all issues, however.

There are also limitations on the amount of data (or bandwidth) that different types of serial communication networks can handle. For example, a Communication Area Network (CAN) bus and a Local Interconnect Network (LIN) are example serial communication networks that are designed for lower data transfer rates and lower speeds. On the other hand, serial communication protocols such as universal serial bus (USB) and Ether for Control Automation Technology (Ether CAT) can handle larger data streams, more data, and more speed, but are typically much more expensive to implement.

As such, there is still need for an alternative approach to handle potential errors, conflicts, and network limitations in a cost efficient manner. It is with respect to these and other considerations that the disclosure made herein is presented.

SUMMARY OF THE INVENTION

The present disclosure describes implementations that relate to a control system having independent communication networks for vehicles.

In a first example implementation, the present disclosure describes a control system for a vehicle. The control system includes: a first communication network having a first communication bus; a second communication network having a second communication bus, independent from the first communication bus; a plurality of devices that are communicatively coupled to the first communication bus, such that each device of the plurality of devices is in direct communication with other devices of the plurality of devices, wherein the plurality of devices include: at least one drive motor controller of an electric motor that drives the vehicle, wherein the at least one drive motor controller is communicatively coupled to the first communication bus and the second communication bus; and at least one input device that commands movement of the vehicle, wherein the at least one input device is communicatively coupled directly to the at least one drive motor controller via the second communication bus, such that a command from the at least one input device to the at least one drive motor controller is independent and isolated from the first communication network In a second example implementation, the present disclosure describes a vehicle including the control system of the first example implementation.

In a third example implementation, the present disclosure describes a method of connecting or communicatively coupling components of the control system of the first example implementation or components of the vehicle of the second example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 7 is a flowchart of a method, according to an example implementation.

DETAILED DESCRIPTION

Disclosed herein are systems and methods associated with using an independent vehicle control network to separate components associated with controlling vehicle movement/ propulsion from other vehicle communications in order to create a more robust and reliable vehicle control architecture.

Figure 1A:
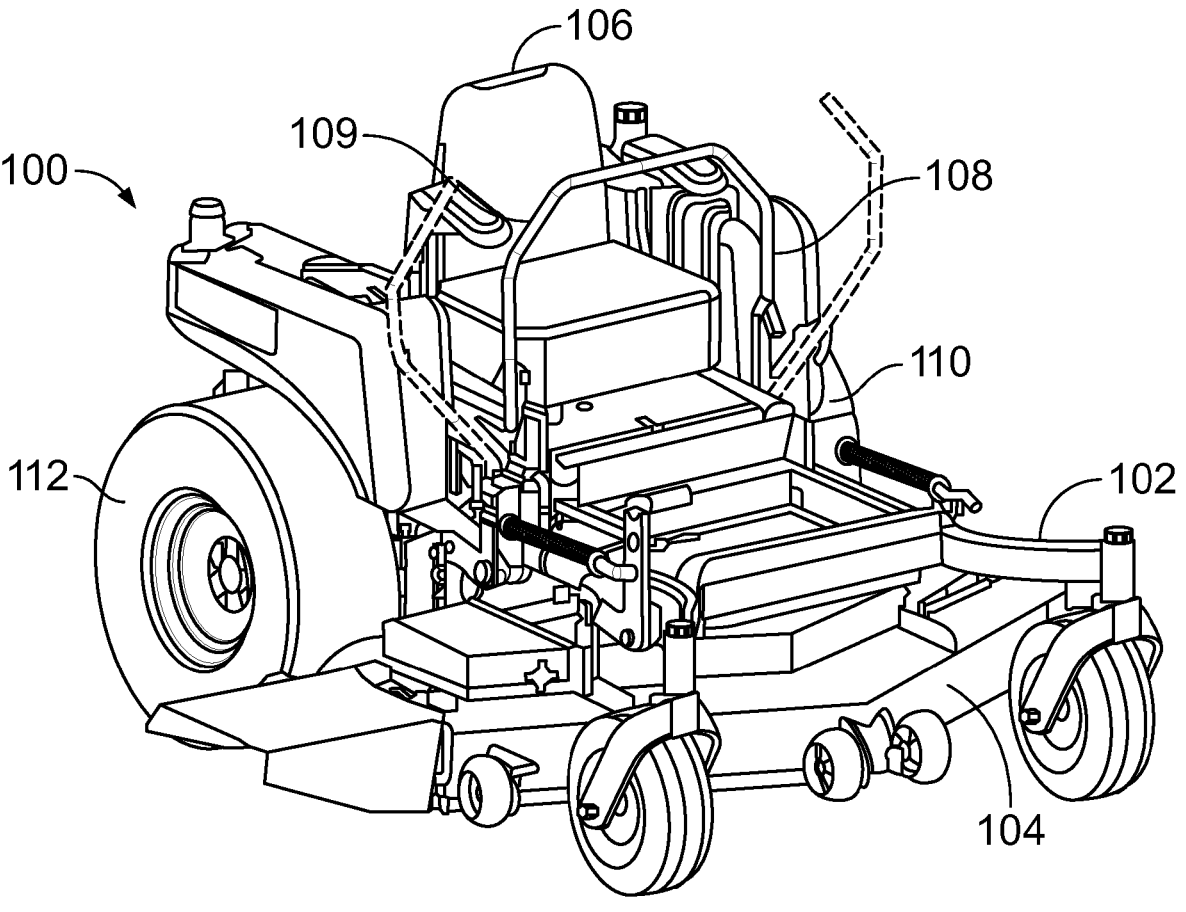
FIG. 1A illustrates a perspective view of a vehicle, according to an example implementation.

FIG. 1A illustrates a perspective view of a vehicle 100, according to an example implementation. The vehicle 100 can be, for example, a ZTR mower (e.g., a lawn mower with a turning radius that is effectively zero).

The vehicle 100 includes a frame 102. The vehicle 100 also includes a mower deck 104 supported by the frame 102. The mower deck 104 can house one or more work tools (e.g., blades) for mowing grass, for example. The vehicle 100 further includes an operator seat 106 and drive input devices 108, 109 for operating the vehicle 100. The drive input devices 108, 109 are shown in FIG. 1A as steering control levers or lap bars, but other configurations (e.g., joysticks, pedals, etc.) could be used.

In examples, a rear mounted engine (not shown) can be mounted to the frame 102 behind the operator seat 106. The engine can be an internal combustion engine configured to drive a power generator. The power generator then provides electric power to one or more electric motors that drive respective rear wheels such as left wheel 110 and right wheel 112 that propel the vehicle 100, for example. The power generator can also provide power to electric motors that drive the work tools (e.g., blades) of the mower deck 104.

In another example, rather than using an engine and a power generator, the vehicle 100 can be a battery-driven vehicle. Particularly, the vehicle 100 can have a rechargeable battery that provides electric power to drive the various motors.

The drive input devices 108, 109 can be configured to control speed and direction of the wheels 110, 112 via actuating the respective electric motors. Thus, the drive system can be controlled by an operator to drive the wheels 110, 112 independently, and propel the vehicle 100.

The vehicle 100 can have several electric motors. For example, the vehicle 100 can have two traction or propulsion electric motors respectively driving the wheels 110, 112 of the vehicle 100, and may include one or more electric motors driving respective work tools (e.g., blades) mounted to the mower deck 104.

Figure 1B:
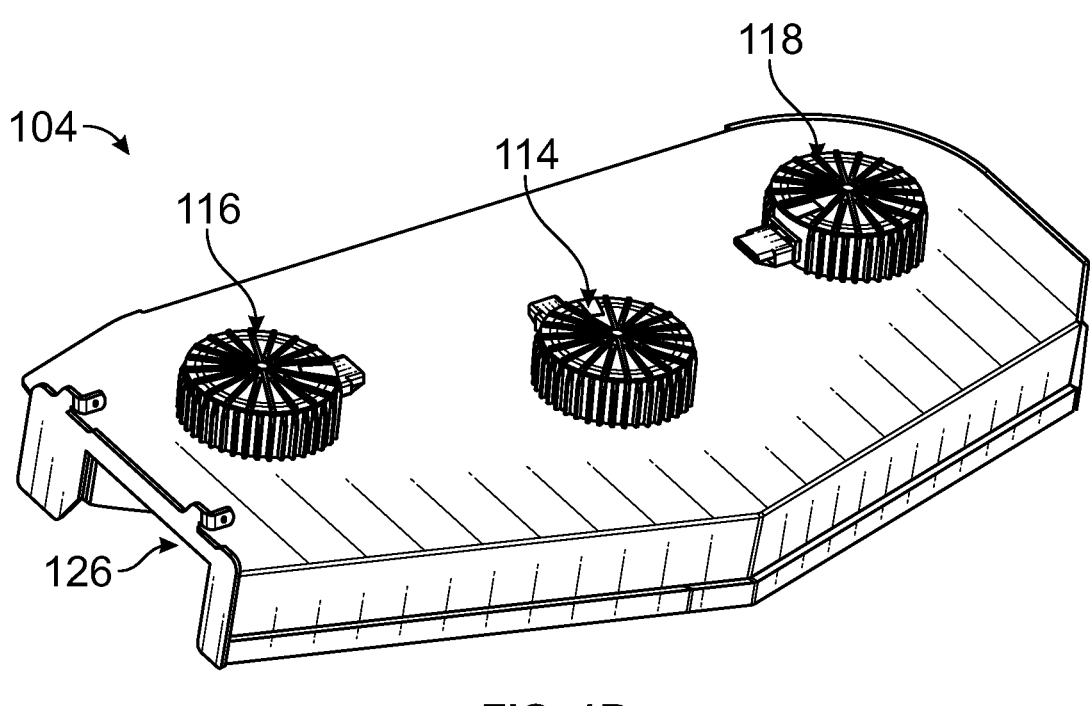
FIG. 1B illustrates a perspective view of a mower deck with electric motors driving blades of the mower deck, according to an example implementation.
Figure 1C:
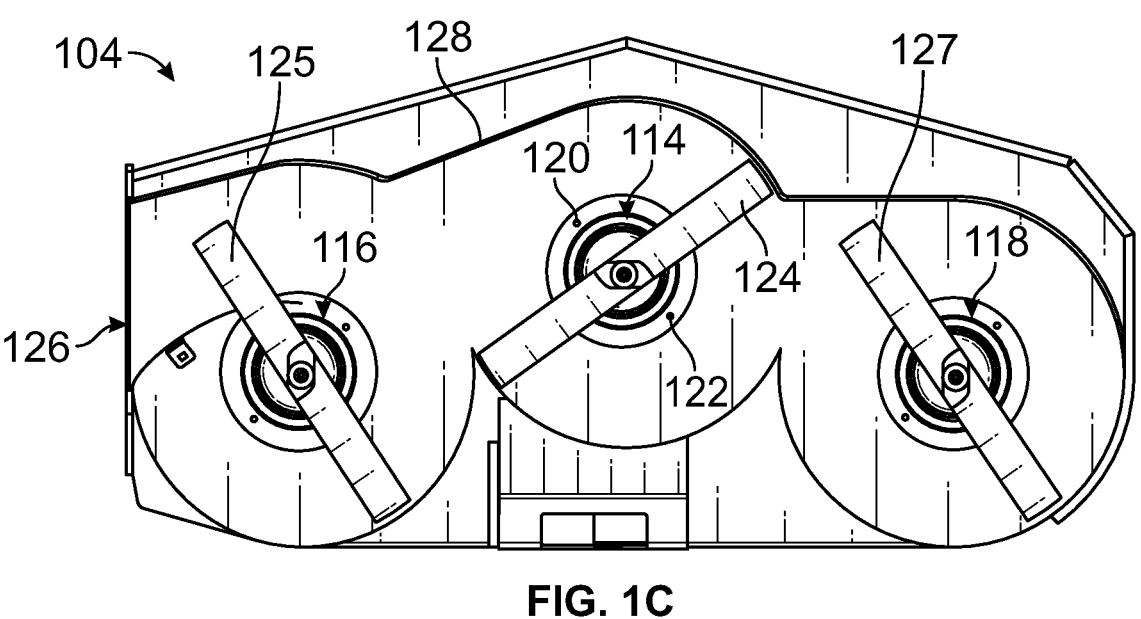
FIG. 1C illustrates a bottom view of the mower deck of FIG. 1B, according to an example implementation.

FIG. 1B illustrates a perspective view of the mower deck 104 with electric motors driving work tools (blades in this case) of the mower deck 104, and FIG. 1C illustrates a bottom view of the mower deck 104, according to an example implementation. The mower deck 104 can be made of sheet metal for example, and may include a plurality of electric motors such as electric motor 114, electric motor 116, and electric motor 118. Although three electric motors are shown, in other example implementations, more or fewer electric motors and work tools could be used.

The electric motors 114-118 can be coupled to the mower deck 104 via fasteners (bolts, screws, etc.). For example, as shown in FIG. 1C, the electric motor 114 is coupled to the mower deck 104 via a bolt 120 and bolt 122.

Referring to FIG. 1C, each of the electric motors 114-118 can be coupled to and is configured to drive a work tool (e.g., blade) for cutting grass. For example, the electric motor 114 is coupled to a work tool 124, the electric motor 116 is coupled to a work tool 125, and the electric motor 118 is coupled to a work tool 127. The mower deck 104 has an outlet 126 for discharging grass that is cut by the work tools 124, 125, 127 of the mower deck 104. The mower deck 104 can include baffles such as baffle 128 that are curved to streamline air flow and direct cut grass to the outlet 126 to be discharged from the mower deck 104.

The configuration of the vehicle 100 is an example configuration and it should be understood that other mower configurations and vehicle types such as skid steers are contemplated. A skid loader, skid-steer loader, or skid steer (e.g., a mini skid steer) is a class of compact heavy equipment with lift arms (boom) that can attach to a wide variety of work tools (e.g., variety of bucket types and attachments).

Figure 2A:
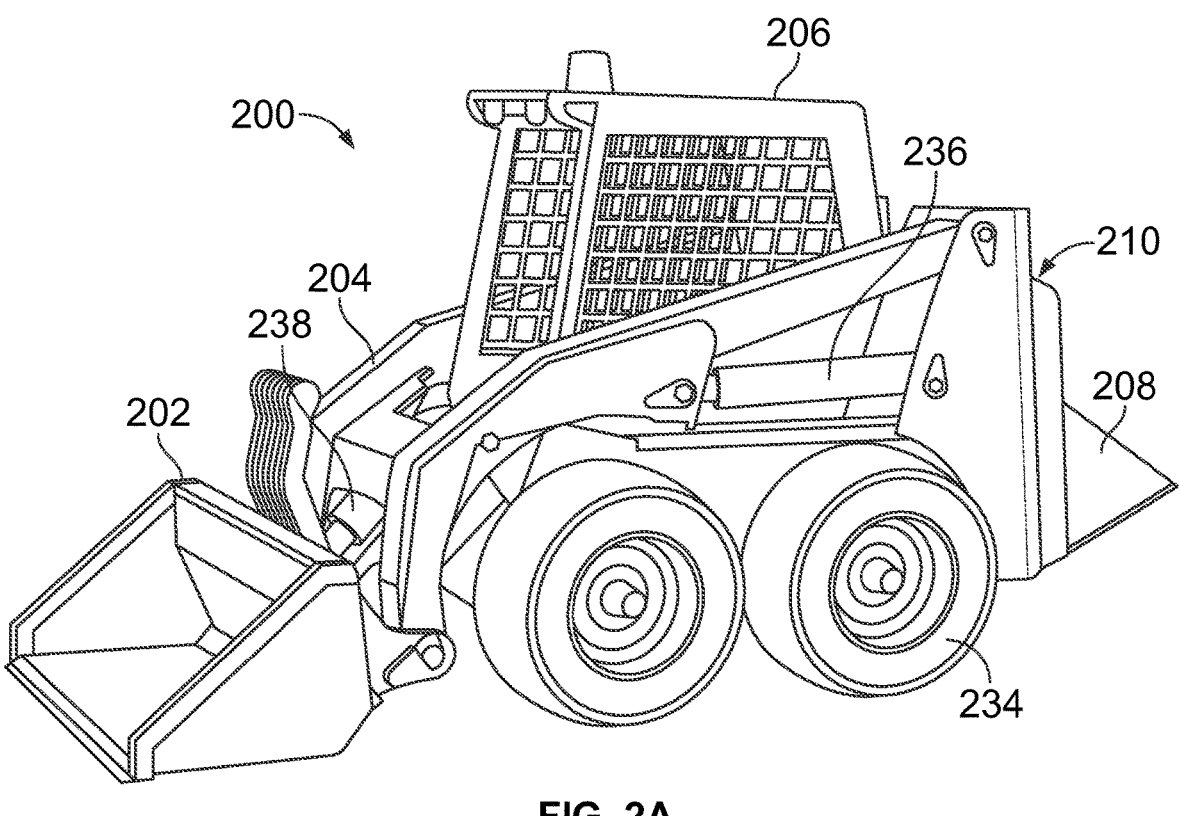
FIG. 2A illustrates a perspective view of a vehicle, according to an example implementation.

FIG. 2A illustrates a perspective view of a vehicle 200, according to an example implementation. The vehicle 200 represents a skid steer as another example vehicle. The vehicle 200 includes a work tool 202 (e.g., a bucket) coupled to a boom 204 (e.g., lift arms), which is attached to a frame of the vehicle 200.

The work tool 202 is movable by one or more actuators. For example, if the work tool 202 is an articulating bucket as shown in FIG. 2A, an actuator can cause the bucket to curl and uncurl. The boom 204 can be lifted and lowered by one or more respective actuators. The vehicle 200 can be setup for multiple types of work tools or attachments (e.g., a grapple, brush, hole diggers, trenchers, etc.) that can replace the bucket shown in FIG. 2A.

In an example, the vehicle 200 can have a seat protected by cage 206. In another example, the vehicle 200 can be a mini skid steer having a stand-on platform 208 on which an operator stands while operating the vehicle 200. In this case, the cage 206 and seat might not be present.

The operator can use any type of input devices mounted to a control panel 210 to operate the vehicle 200. In the example implementation of FIG. 2A, the control panel 210 is shown close to the stand-on platform 208 to enable the operator to control the various operations of the vehicle 200. In another example, where the operator is seated, as opposed to standing on the stand-on platform 208, the control panel 210 may be mounted within the cage 206.

Figure 2B:
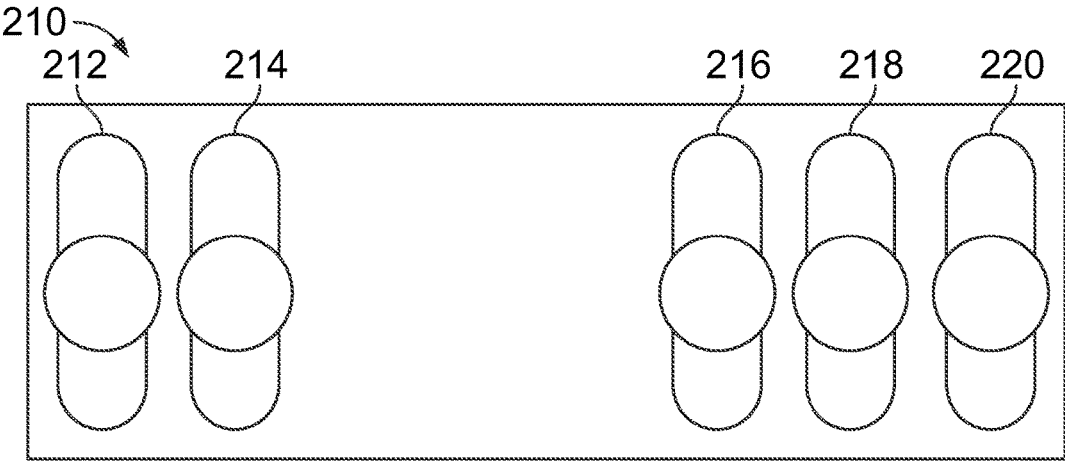
FIG. 2B illustrates a schematic view of a control panel of the vehicle of FIG. 2A, according to an example implementation.

FIG. 2B illustrates a schematic view of the control panel 210, according to an example implementation. As shown, the control panel 210 can have a first drive input device 212 and a second drive input device 214. The drive input devices 212, 214 are used for controlling propulsion of the vehicle 200.

The control panel 210 can also include work tool input devices, such as work tool input device 216, work tool input device 218, and work tool input device 220. Three work tool input devices are shown as an example. More or fewer work tool input devices could be used based on the type of work tool. For example, if the work tool 202 is a bucket, the work tool input device 216 can be used to drive the boom 204 up and down, while the work tool input device 218 can be used to curl and uncurl the bucket. For other types of work tools, a third operation may be required (e.g., rotating the tool about its axis in addition to the lifting/lowering and curl/uncurl/pitch operations). Such third operation may be controlled by the work tool input device 220.

As described below, the drive input devices 212, 214 may be configured in some examples to operate the work tool 202 in addition to controlling propulsion of the vehicle 200. In these examples, the work tool input devices 216-220 can be configured as switches that activate electric motor drives associated with operating the work tool 202.

The input devices can be of several types. For example, the drive input devices 212, 214 can be levers of (e.g., lap bar type levers) or can be configured as joysticks.

Figure 2C:
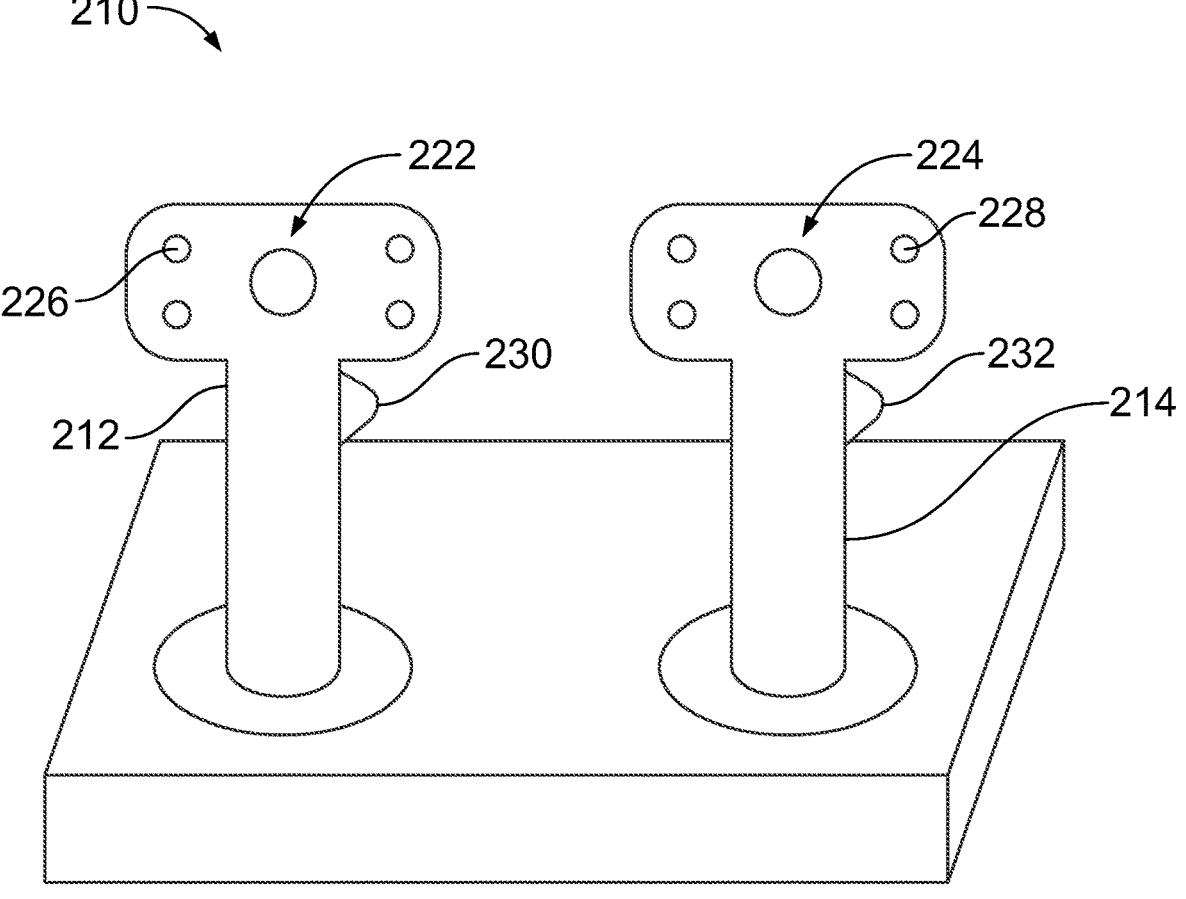
FIG. 2C illustrates a partial perspective view of the control panel of FIG. 2B showing drive input devices as joysticks, according to an example implementation

FIG. 2C illustrates a partial perspective view of the control panel 210 showing the drive input devices 212, 214 as joysticks, according to an example implementation. Particularly, the drive input device 212 is configured as a fixed grip left joystick, and the drive input device 214 is configured as a respective fixed grip right joystick.

In this configuration, the operator is able to hold on to a steady, solid joystick for comfort and safety while operating the vehicle 200. For example, the drive input device 212 can have a multi-axis thumb joystick 222, and the drive input device 214 can have a multi-axis thumb joystick 224.

The operator can use the multi-axis thumb joysticks 222, 224 to operate the vehicle 200 in multiple modes. For instance, the y-axis motion of the multi-axis thumb joystick 222 and the y-axis motion of the multi-axis thumb joystick 224 can be used for propelling the vehicle 200 forward and backward. In this example, x-axis motion of the multi-axis thumb joysticks 222, 224 can be used to control the work tool 202. In another example, one of the multi-axis thumb joysticks 222, 224 can be used for propelling the vehicle 200, while the other can be used for controlling the work tool 202. In these examples, the work tool input devices 216-220 might not be needed, or might be used for other functions or as activating switches that place motor controllers in a standby or "ready" mode. Other configuration modes are possible and can be selected by the operator or the manufacturer of the vehicle 200.

The drive input device 212 can have a plurality of buttons, such as button 226. Similarly, drive input device 214 can have a plurality of buttons, such as button 228. Such buttons can be configured for controlling various devices of the vehicle 200. Further, in an example, the drive input device 212 can have a trigger switch 230, while the drive input device 214 can have a trigger switch 232. The trigger switches 230, 232 may also be used for controlling various components of the vehicle 200.

In examples, an engine (not shown) can be mounted to the vehicle 200. The engine can be an internal combustion engine configured to drive a power generator. Referring back to FIG. 2A, the power generator then provides electric power to one or more electric motors that drive respective front or rear wheels such as left wheel 234 (and a corresponding wheel on the other side of the vehicle 200) to propel the vehicle 200, for example.

Although the vehicle 200 is shown as a wheeled skid steer, in other examples, the vehicle 200 can be a tracked skid steer. Particularly, the vehicle 200 can have respective tracks on both sides of the vehicle 200, and the tracks are driven by at least one respective electric motor to propel the vehicle 200.

The power generator can also provide power to electric motors that drive the work tool 202. For example, one electric motor can drive the curl and uncurl operations, while another electric motor can control the boom lifting and lowering operations. In one example, the electric motor can drive a hydraulic pump, which provides fluid flow through control valves to a boom cylinder 236 to operate the boom 204 (lift and lower operations) and to a work tool cylinder 238 to operate the work tool 202 (curl and uncurl operations).

In another example, electric motors can be disposed at joints that couple the boom 204 to a frame of the vehicle 200 and couple the work tool 202 to the boom 204. Electric motors can be positioned at or proximate the joints to rotate such joints (e.g., directly or via gearboxes), thereby rotating the boom 204 and the work tool 202 about their joints. In another example, the electric motors can drive electric linear actuators in lieu of the boom cylinder 236 and the work tool cylinder 238.

In an example, rather than using an engine and a power generator, the vehicle 200 can be a battery-driven vehicle. Particularly, the vehicle 200 can have a rechargeable battery that provides electric power to drive the various motors.

The drive input devices 212, 214 can be configured to control speed and direction of the wheels (e.g., the wheel 234) or tracks via actuating at least one electric motor. In an example, the drive system can be controlled by an operator to drive each of the wheels or tracks independently, and propel the vehicle 200.

Thus, the vehicle 200 can have several electric motors. For example, the vehicle 200 can have two traction or propulsion electric motors respectively driving the wheels or tracks of the vehicle 200, and may include one or more electric motors driving the work tool 202 and/or other work tools.

The vehicle 100 and the vehicle 200 are example vehicles. The control system described below can be used with either type of vehicles or other similar types of outdoor power or turf equipment.

Figure 3:
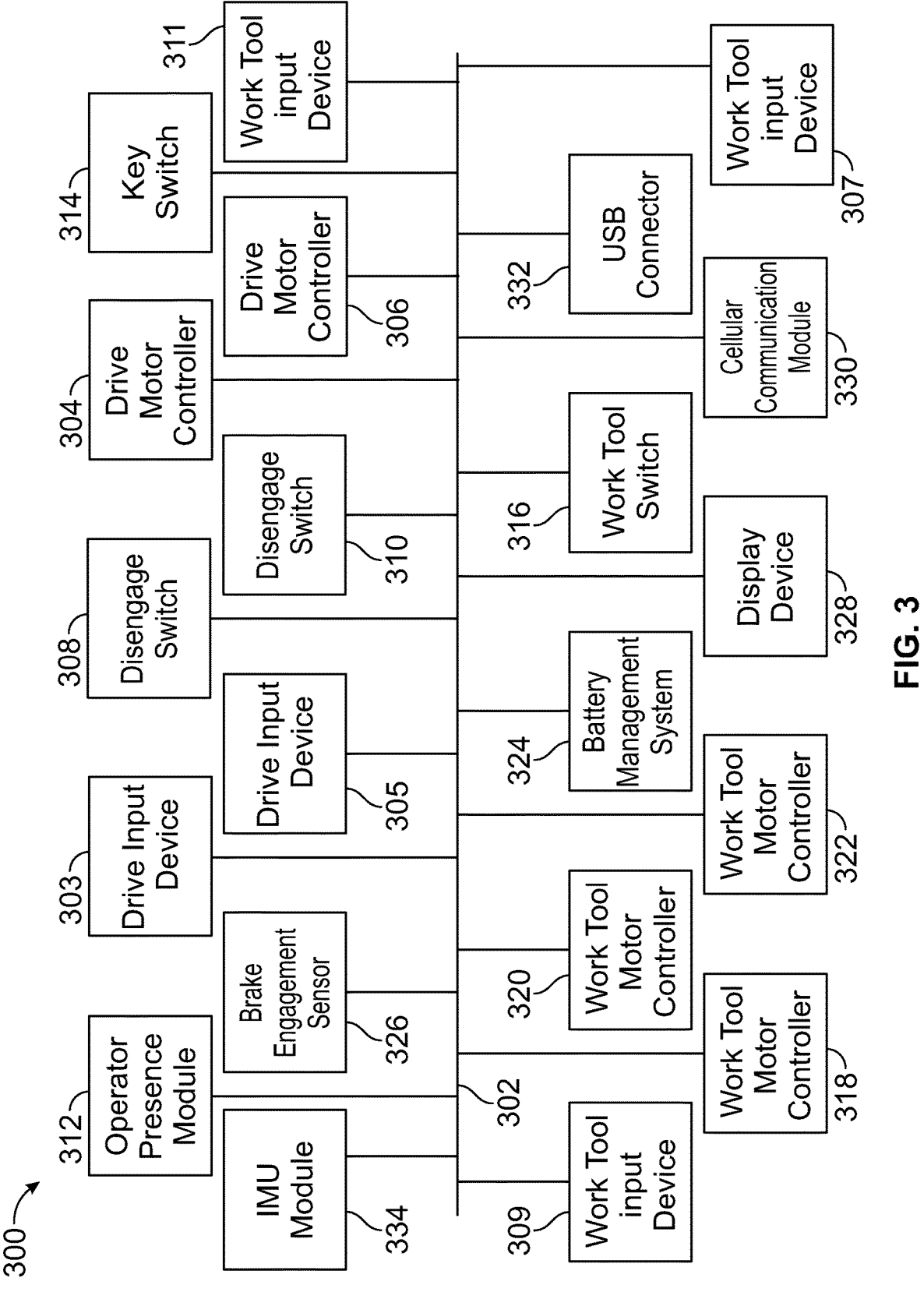
FIG. 3 is a block diagram of a control system of a vehicle, according to an example implementation.

The vehicle 100, 200 can include a variety of other input devices (e.g., buttons and switches) and may include a plurality of sensors (e.g., an operator presence switch). The vehicle 100, 200 can have a control system that includes a serial network to facilitate direct communication between the various devices FIG. 3 illustrates a control system 300, according to an example implementation. The control system 300 represents a control system for either of the vehicles 100, 200. In the example implementation of FIG. 3, components of the control system 300 are connected directly to a communication bus 302, and communicate continually and directly with each other via the communication bus 302. In other words, the control system 300 has an architecture that is distributed or non-centralized, allowing various components (e.g., sensors, devices, switches, control modules, etc.) of the vehicle 100, 200 to communicate with each other directly using a bus communication architecture. Each component may be configured to handle its own safety decisions and behavior.

As an example, the communication bus 302 can be any type of a serial communication bus such as a CAN bus or a USB. In an example, the communication bus 302 is part of a communication network (e.g., a CAN network) that involves a message-based protocol allowing direct communication between various devices/components of the vehicle 100, 200. For each device, the data in a data frame is transmitted serially in such a way that if more than one device transmits at the same time, the highest priority device can continue while the other devices can back off sending their messages. Data frames are received by all devices, including by the transmitting device. With this configuration, all of the plurality of connected devices of the control system 300 can communicate substantially instantaneously with any and all of the other devices connected to the communication bus 302. Other communication protocols that could be used include Local Interconnect Network (LIN), Inter-Integrated Circuit (I2C), Serial Peripheral Interface (SPI), Universal Asynchronous Receiver/Transmitter (UART), CAN OPEN, RS-485, Ether for Control Automation Technology (Ether CAT), etc.

The devices of the control system 300 can include a battery, a plurality of sensors, input devices, modules, controllers, electric motors, etc. For example, the control system 300 can include drive input device 303 and drive input device 305. The drive input devices 303, 305 represent the drive input devices 108, 109 of the vehicle 100 or the drive input devices 212, 214 of the vehicle 200, for example.

The drive input devices 303, 305 provide signals or messages to the communication bus 302. The signals/messages from the drive input devices 303, 305 may operate as throttle indicators or commands providing an analog voltage signal (e.g., between-5 volts and +5 volts) or message over the communication bus 302. The signal from the drive input device 303 is transmitted via the communication bus 302 to a drive motor controller 304 (e.g., left motor controller) configured to drive the electric motor propelling the left wheel 110, 234 (or left track). Similarly, the signal from the drive input device 305 is transmitted via the communication bus 302 to a drive motor controller 306 (e.g., right motor controller) configured to drive the electric motor propelling the right wheel (e.g., the right wheel 112 or the right wheel/track of the vehicle 200). In examples, the drive input devices 303, 305 are connected to one or more separate communication bus (different from the communication bus 302) on one or more respective alternative networks to alleviate any latency issues as described in more details below.

In an example, the drive motor controllers 304, 306 can each include an inverter. The inverter can be configured as a power converter that converts direct current (DC) power received at the inverter (e.g., received from a battery) to three-phase, alternating current (AC) power that can be provided to wire windings of a stator of an electric motor to drive the electric motor. The drive motor controllers 304, 306 may also have a microprocessor that provides a pulse width modulated (PWM) signal to operate the power converter, for example.

The control system 300 can include variety of sensors and switches. For example, the control system 300 may include a disengage switch 308 and a disengage switch 310. The disengage switch 308 may be associated with the drive input device 303, for example. If the drive input device 303 is placed in a neutral or disengage position (e.g., when the operator wishes to stop the vehicle 100, 200), the disengage switch 308 provides a confirmation that the drive input device 303 is placed in the neutral position in addition to the signal from the drive input device 303 indicating a neutral or disengage position.

For example, on some vehicles, the drive input device 303 may be pushed by the operator all the way in one direction to place the drive input device 303 in a disengage position. In some examples, placing the drive input device 303 in a disengage position may engage a parking brake of the vehicle 100, 200. The disengage switch 308 may be a mechanical switch, a Hall-Effector sensor, or a magnetic sensor configured to detect that the drive input device 303 has reached such disengage position. In some examples, multiple position detecting devices or sensors may be combined into an assembly coupled to the drive input device 303.

In response to placing the drive input device 303 in a disengage position, the disengage switch 308 outputs a signal on the communication bus 302 indicating that the drive input device 303 is in the disengage position, thereby causing the drive motor controller 304 to go to a sleep mode, for example. The disengage switch 310 operates in a similar manner with respect to the drive input device 305 and the drive motor controller 306.

The control system 300 may further include several sensors or switches that indicate whether the vehicle 100, 200 is ready for operation or should be turned off (or placed in a sleep mode). For example, the control system 300 may include an operator presence module 312 connected to the communication bus 302. The term "module" is used generally herein to include software, hardware, or a combination of software and hardware components. Further, the terms "module," "component," and "device" are used interchangeably.

The operator presence module 312 can have an operator presence switch (e.g., seat switch, sensor on the stand-on platform 208, touch sensitive sensor on the drive input devices 303, 305, etc.) that is configured to detect operator presence (e.g., detect whether the operator is seated at an operator seat of the vehicle 100, 200 or standing on the stand-on platform 208, and is thus about to operate the vehicle 100, 200). The operator presence module 312 can then broadcast on the communication bus 302 a message indicating whether the operator is present to allow other devices to take appropriate actions (e.g., enable the drive motor controllers 304, 306 to operate their respective electric motors).

The control system 300 can further include key switch 314. If the operator places a key in a key hole or press a "turn on" button (or a combination of the two), the key switch 314 broadcasts a signal to the communication bus 302 for other components to receive an indication that the operator is ready to operate the vehicle 100, 200. In an example, the key switch 314 can be implemented as a keypad combination style configuration, and may be integrated into a display or as a dedicated keypad.

The control system 300 can further include several work tool motor controllers to operate the electric motors that drive the work tools of the vehicle 100, 200 depending on the number and type of work tools. For example, the vehicle 100 can have work tool motor controllers controlling the electric motors 114-118, which are respectively coupled to the work tools 124, 125, 127 (the grass cutting blades) of the vehicle 100. As another example, as shown and described with respect to FIG. 2A, the vehicle 200 may include the work tool 202 as a bucket, with one or more electric motors controlling operation of the boom 204 and the work tool 202. Each electric motor is controlled by a respective work tool motor controller.

As such, the control system 300 can include a work tool motor controller 318, a work tool motor controller 320, and a work tool motor controller 322, each work tool motor controller operating at least one respective electric motor configured to control a respective aspect of a work tool (e.g., boom movement or bucket curl of the work tool 202, spinning of the work tools 124, 125, 127, etc.). Although three work tool motor controllers are shown, more or fewer electric motors and respective work tool motor controllers can be used based on the type and number of work tools and the type of vehicle.

As shown, the control system 300 can include work tool input device 307, work tool input device 309, and work tool input device 311. The work tool input devices 307, 309, 311 may represent input devices controlling operation of the work tools 124, 125, 127 of the vehicle 100 or represent the work tool input devices 216-220 of the vehicle 200, for example.

The work tool input devices 307, 309, 311 provide signals or messages to the communication bus 302. The signals/messages from the work tool input devices 307, 309, 311 may operate as commands providing an analog voltage signal (e.g., between-5 volts and +5 volts) or bus messages. The signals/messages from the work tool input devices 307, 309, 311 are transmitted via the communication bus 302 to the work tool motor controllers 318-322, respectively.

In an example, the vehicle 100, 200 may have a work tool switch 316 that the operator uses to allow operation of the work tool 202. For example, the work tool switch 316 can be a power take-off (PTO) switch that the operator uses to command the work tools 124, 125, 127 (e.g., the blades) of the mower deck 104 to spin. As such, activation of the PTO switch by the operator indicates to the work tool motor controllers 318-322 of the vehicle 100 that the operator is ready to cut grass and wants the blades to spin. Similarly, for the vehicle 200, activation of the work tool switch 316 by the operator indicates to the work tool motor controllers 318-322 of the vehicle 200 that the operator is ready to operate the work tool 202.

When activated by the operator, the work tool switch 316 can broadcast a "Work Tool On" message on the communication bus 302. The work tool switch 316 can be a separate switch, or can be integrated into other modules or components (e.g., the drive input devices 303, 305 or the work tool input devices 307, 309, 311).

In an example, when the vehicle 100, 200 is battery-powered, the vehicle 100, 200 includes a battery that may have several battery modules, each module having a respective plurality of battery cells. In this example, the control system 300 can include a battery management system (BMS) 324 configured as an electronic regulator that monitors and controls the charging and discharging of battery modules.

In an example, the BMS 324 may be configured to measure voltages of the battery modules and stop charging them when a desired voltage is reached. Further, the BMS 324 can be configured to monitor parameters that affect life and/or performance of the battery modules as well as ensuring safe operation of the battery modules. Safe operation includes, as examples, operating below a threshold temperature to increase the lifespan of the battery modules, prevent overheating, prevent failure of the battery modules, etc.

The BMS 324 can further monitor and control main power voltage, battery or cell voltage, charging and discharging rates of the battery modules, temperatures of the battery modules or their individual cells, health of the battery modules or their individual cells, coolant temperature and flow for air or liquid cooling parameters of a cooling system of the battery modules or their individual cells, etc. The BMS 324 may also be configured to limit the amount of current drawn from the battery, or provided to the battery if the battery is in a regeneration mode. As such, the BMS 324 can broadcast signals to the communication bus 302 indicating whether the battery that powers the electric motors is ready (e.g., has enough charge, operating at an acceptable temperature, etc.). The BMS 324 may also indicate whether the battery can receive regenerative braking power, and how much power can the battery receive and store.

The vehicle 100, 200 may include pedals, levers, or an electronic switch (which could be integrated into the drive input devices 303, 305) to engage the parking brakes of the vehicle 100, 200. If the operator engages the parking brakes, then the operator does not intend to operate the vehicle 100, 200 further, but is rather placing it in a parked position.

Thus, the control system 300 can have a brake module or brake engagement sensor 326 coupled to the braking pedal or lever. The brake engagement sensor 326 is configured to broadcast on the communication bus 302 a signal/message indicating whether the parking brake is engaged or not.

In an example, the control system 300 can further include a display device 328. The display device 328 is configured to display information to the operator of the vehicle 100, 200 and can be used also as an input device. For instance, the display device 328 can include a touchscreen that allows the operator of the vehicle 100, 200 to interact with various components of the control system 300 and obtain various information as desired, while also providing operating commands to components or devices.

In an example, the control system 300 includes a cellular communication module 330. The cellular communication module 330 allows the vehicle 100, 200 to communicate with remote computing devices (e.g., remote servers), for example, using a cellular communication protocol such as CDMA (e.g., 1xRTT or 1xEV-DO), WiMAX, LTE, IDEN, GSM, Wi-Fi, HSPA, etc.). As an example, the control system 300 may communicate information indicative of a condition of the vehicle 100, 200 and its various components to a server. Such information may be helpful in determining whether the vehicle 100, 200 is due for maintenance, for example. Such a remote server may also be used to communicate software updates (e.g., "over the air" updates) to the control system 300, for example, via the cellular communication module 330.

In an example, the control system 300 may include a USB connector 332. The USB connector 332 can be used to plug a computing device (e.g., a laptop) to the vehicle 100, 200 to capture and download data (e.g., diagnostic data) stored in a memory (not shown) of the control system 300, for example. Such computing device can also be used to provide software updates to the control system 300, change calibration parameters of various modules of the control system 300, etc.

The control system 300 further includes one or more inertial measurement unit (IMU) modules such as IMU module 334 in communication with the communication bus 302. The IMU module 334 can be mounted at any location in the vehicle 100, 200 (e.g., the vehicle frame, any device, motor controller, electric motor, etc.). The IMU module 334 may have sensors (e.g., magnetometer, accelerometers, gyroscopes, etc.) that detect a degree of inclination (whether the vehicle 100, 200 is on flat ground or a ramp and the degree of the inclination of the ramp), rate of angular change about yaw, roll or pitch axis, heading, and/or acceleration in three axes (e.g., x, y, and z axes in a Cartesian coordinate system to detect drops, sideways impact, and forward/reverse acceleration) of the vehicle 100, 200.

If multiple IMU modules are used, they can be mounted at various locations on the vehicle 100, 200. For example, IMU modules can be mounted to the drive motor controllers 304, 306 and/or the work tool motor controllers 318-322. Additionally or alternatively, IMU modules can be coupled directly to the respective electric motors being controlled by the motor controllers. In examples, the motor controllers can be mounted to their respective electric motors. In other words, each motor controller is integrated with its electric motor in an assembly. An IMU module can then be mounted to or integrated into each such assembly. The IMU modules can also be mounted to any of the drive input devices 303, 305, the work tool input devices 307, 309, 311, or the display device 328.

The devices (e.g., components, modules, sensors, etc.) shown in FIG. 3 are examples. More or fewer devices can be used. Particularly, another advantage of the network-based configuration of the control system 300 is that other functionality can be added by connecting other modules to the communication bus 302. For example, a vehicle manufacturer may over time produce modules that can enhance operations and performance of the vehicle 100, 200, and such modules can be added as they become available. As another example, optional modules can be obtained and plugged into the communication bus 302 to add functionality as desired.

Components of the control system 300 may be configured to work in an interconnected fashion with each other and/or with other components coupled to respective systems. One or more of the described operations or components of the control system 300 may be divided up into additional operational or physical components, or combined into fewer operational or physical components. In some further examples, additional operational and/or physical components may be added to the control system 300. Still further, any of the components or modules of the control system 300 may include or be provided in the form of a processor (e.g., a microprocessor, a digital signal processor, etc.) configured to execute program code including one or more instructions for implementing logical operations described herein.

The control system 300 may further include any type of computer readable medium (non-transitory medium) or memory, for example, such as a storage device including a disk or hard drive, to store the program code that when executed by one or more processors cause the control system 300 to perform the operations described above. In an example, the control system 300 may be included within other systems.

The control system 300 involves a single serial communication network with a single communication bus (the communication bus 302) connecting the various devices, modules, components, etc. described above. Failures or delays caused by such single serial network handling both vehicle control communication (e.g., communication between the drive input devices 303, 305 and the drive motor controllers 304, 306) and communication between all the other components can cause undesirable effects for the control of the vehicle 100, 200.

For example, a serial communication network may have some latency issues in communication between the various components of the system. Particularly, limited communication rate within the communication network may cause latency in signal communication through the communication network. Additional sources of latency can be in the modules, components, and controllers, and the responsiveness and bandwidth of the physical system (e.g., electric motors, etc.). Latency can be defined as a time interval between a command signal and response, or a time delay between the cause and the effect of some physical change in the vehicle 100, 200. Latency is thus a consequence of the limited speed with which any physical interaction can propagate. Such latency can lead to a delayed response and limited bandwidth for the vehicle 100, 200, which can cause a reduced performance.

For instance, latency can cause perceivable lag in the movement control of the machine, which results in a "jerky" or less smooth control feel. As such, it may be desirable to configure the control system of the vehicle 100, 200 in a manner that alleviates the effects of such latency.

Particularly, it may be desirable to have independent communication networks for the vehicle. A first communication network can be used to handle communication between various components of the vehicle excluding components associated with propulsion of the vehicle. The first communication network can also handle safety related information, for example.

The propulsion components may include, for example, the vehicle movement input devices (e.g., the drive input devices 303, 305) and the drive motor controllers 304, 306. Such propulsion-associated components can be placed on a second communication network such that they can communicate with each other independently from the first communication network. In examples, two additional network can be used to handle propulsion-associated components.

By separating the vehicle movement control information and components (i.e., the propulsion-associated components) from the first communication network, an inherent redundancy is created. For the vehicle 100, 200 to move, a "Go" message is issued the first communication network (e.g., from various safety modules, the key switch 314, the operator presence module 312, the BMS 325, etc.) in addition to movement commands from the drive input devices 303, 305 on the second communication network.

Figure 4:
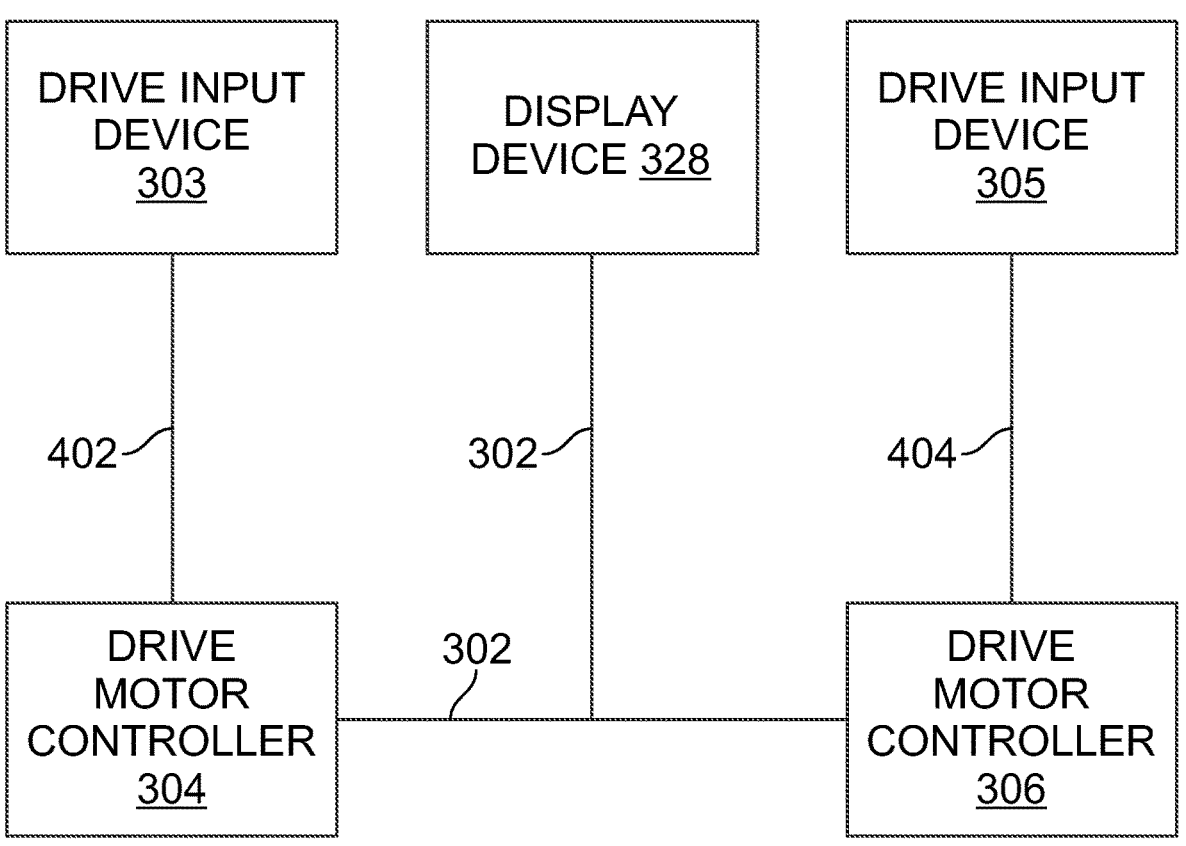
FIG. 4 is a partial block diagram of a control system involving multiple independent communication networks, according to an example implementation.

FIG. 4 is a partial block diagram of a control system 400 involving multiple independent communication networks, according to an example implementation. The partial block diagram of the control system 400 shown in FIG. 4 does not show many of the components of the control system 300 connected to the communication bus 302 to reduce visual clutter in the drawing. However, it should be understood that other components, modules, or devices are connected to the communication bus 302 (e.g., the operator presence module 312, the disengage switches 308, 310, the key switch 314, the BMS 324, the brake engagement sensor 326, etc.).

The communication network having the communication bus 302 is a first communication network. The control system 400 includes a second communication network having a second communication bus 402. The control system 400 includes a third communication network having a third communication bus 404. As depicted in FIG. 4, the second communication network involves a direct communication connection from the drive input device 303 to the drive motor controller 304, and the third communication network involves a direct communication connection from the drive input device 305 to the drive motor controller 306.

For example, as shown in FIG. 4, the drive input device 303 is communicatively coupled to, and is in direct communication with, the drive motor controller 304 via the second communication bus 402. Similarly, the drive input device 305 is communicatively coupled to, and is in direct communication with, the drive motor controller 306 via the third communication bus 404. This direct communication can use serial communication protocol, e.g., CAN, a differential signal, a Pulse Width Modulated (PWM) signal protocol, or other serial communication protocol. In another example, the direct communication between the drive input devices 303, 305 and the drive motor controllers 304, 306 involves a wireless communication protocol such as Bluetooth or Wi-Fi.

In this example implementation of FIG. 4, the vehicle movement input devices (e.g., the drive input devices 303, 305) command movement of the vehicle 100, 200, and the movement commands are independent and isolated from the first communication network. This separation of movement commands allows for more flexibility in what information can be shared on the first communication network. By removing motion control from the first communication network (e.g., removing messages associated with propulsion from the communication bus 302), other messages can be prioritized, thereby increasing flexibility and bandwidth of the first communication network.

In one example, the second and third communication networks can be the same network, and thus the second communication bus 402 and the third communication bus 404 can be the same communication bus. However, in other examples, the third communication network and the third communication bus 404 are independent and isolated from the second communication network and the second communication bus 402, respectively.

Further, as shown, the drive motor controller 304 can be communicatively coupled to both the communication bus 302 of the first communication network and the second communication bus 402 of the second communication network. Similarly, the drive motor controller 306 can be communicatively coupled to both the communication bus

302 of the first communication network and the third communication bus 404 of the third communication network. With this configuration, the drive motor controllers 304, 306 can provide information to devices of the first communication network. For example, the drive motor controllers 304, 306 can provide their operating parameters and feedback from sensors of their respective electric motors to be displayed on the display device 328, which is connected to the communication bus 302.

In the example implementation of FIG. 4, the drive motor controller 304 is communicatively coupled to the drive motor controller 306 via the first communication bus 302 only. However, in other example implementations, they can be connected to each other via one or more of the communication buses 402, 404 as well.

Figure 5:
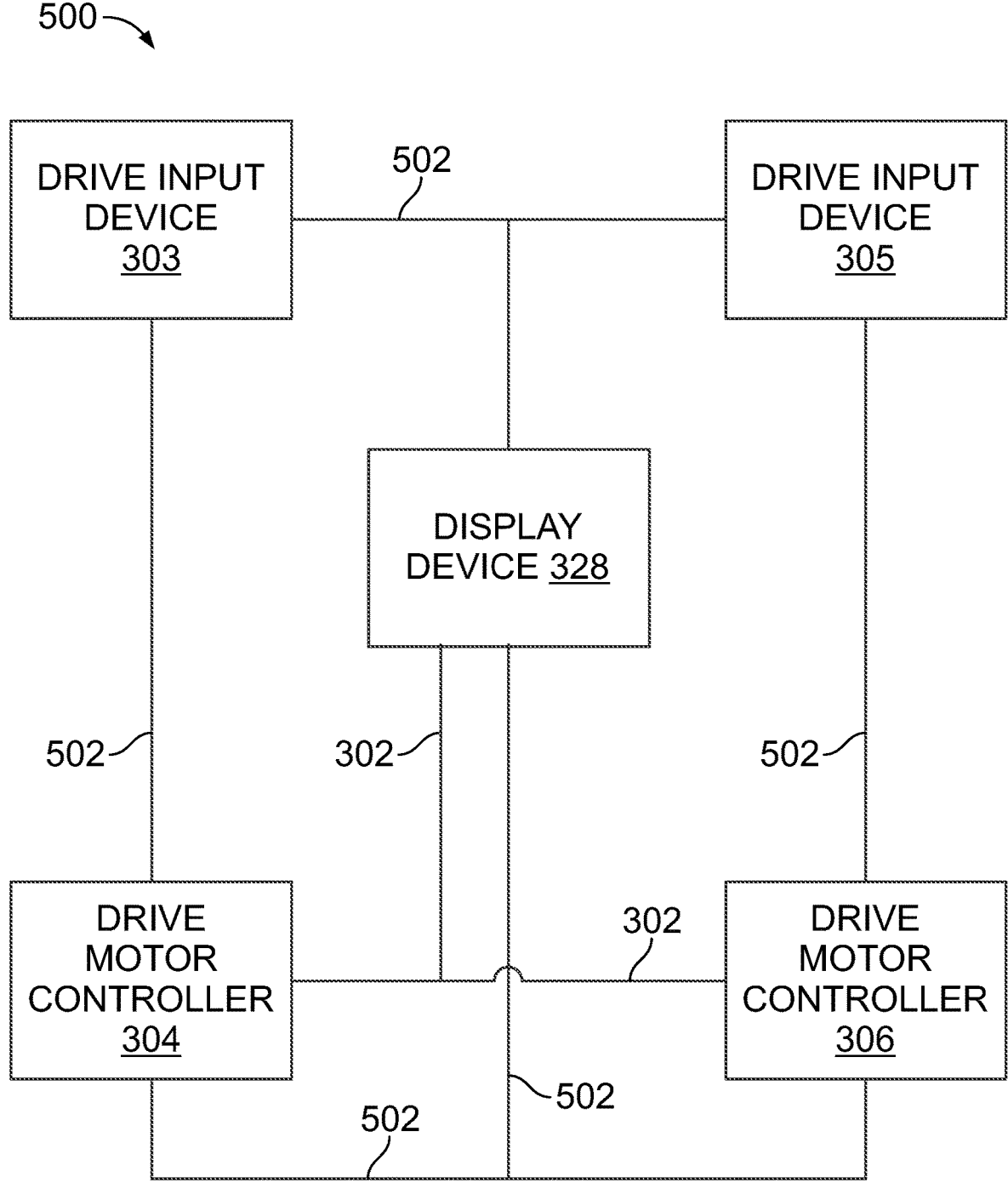
FIG. 5 is a partial block diagram of a control system involving two independent communication networks, and a display device connected to both communication networks, according to an example implementation.

FIG. 5 is a partial block diagram of a control system 500 involving two independent communication networks, and the display device 328 connected to both communication networks, according to an example implementation. The partial block diagram of the control system 500 does not show many of the components of the control system 300 connected to the communication bus 302 to reduce visual clutter in the drawing. However, it should be understood that other components, modules, or devices are connected to the communication bus 302 (e.g., the operator presence module 312, the disengage switches 308, 310, the key switch 314, the BMS 324, the brake engagement sensor 326, etc.).

Similar to the control system 400, the communication network having the communication bus 302 is a first communication network. The control system 500 includes a second communication network having a second communication bus 502. As depicted in FIG. 5, the second communication network involves a direct communication connection from the vehicle movement input devices, such as the drive input devices 303, 305, to the corresponding drive motor controller.

For example, as shown in FIG. 5, the drive input device 303 is communicatively coupled directly to the drive motor controller 304 via the second communication bus 502, and the drive input device 305 is communicatively coupled directly to the drive motor controller 306 via the second communication bus 502. This direct communication can use any serial communication protocol or may involve a wireless communication protocol such as Bluetooth or Wi-Fi. In this example implementation of FIG. 5, the vehicle movement input devices (e.g., the drive input devices 303, 305) command the movement of the vehicle 100, 200, and the movement commands are independent and isolated from the first communication network.

With the configuration of the control system 500, the drive motor controllers 304, 306 are communicatively coupled to both the communication bus 302 of the first communication network and the second communication bus 502 of the second communication network. Further, the display device 328 is also in communication with both the communication bus 302 of the first communication network and the second communication bus 502. Thus, the display device 328 has the ability to display information from two independent serial communication networks.

Also, the drive motor controller 304 is communicatively coupled to the drive motor controller 306 via both the first communication bus 302 and the second communication bus 502. This configuration may enhance system reliability due to the inherent redundancy.

Figure 6:
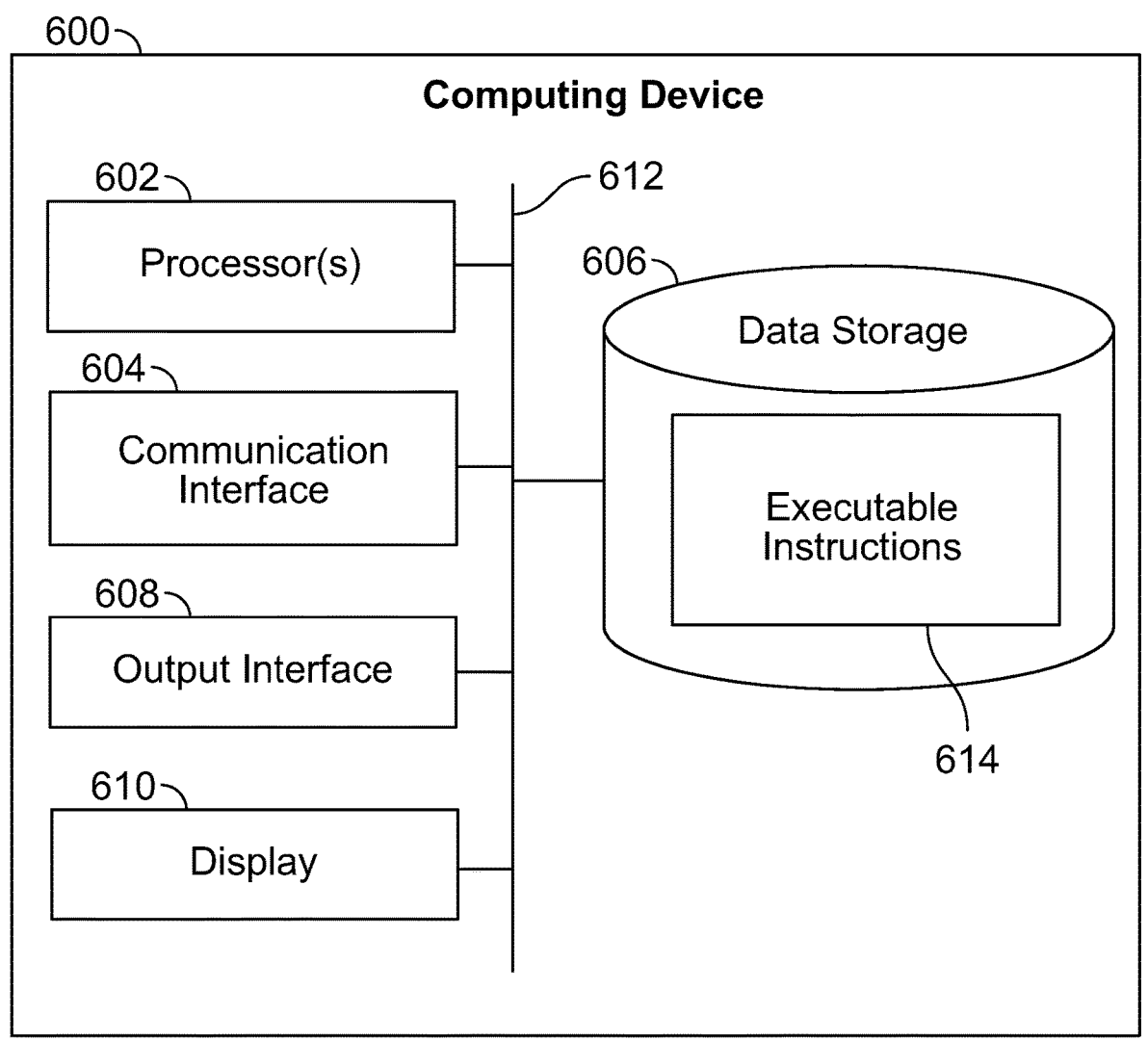
FIG. 6 is a block diagram of a computing device, according to an example implementation.

FIG. 6 is a block diagram of a computing device 600, according to an example implementation. The computing device 600 can represent, or can be included in, any of the devices and sensors described above (e.g., the operator presence module 312, the drive motor controllers 304, 306, the drive input devices 303, 305, the work tool motor controllers 318-322, the work tool input devices 307, 309, 311, the display device 328, the BMS 324, the IMU module 334, any of the sensors, switches, or devices described above with respect to FIGS. 3-5).

The computing device 600 has processor(s) 602, a communication interface 604, and data storage 606, each connected to a communication bus 612. The computing device 600 may also include hardware to enable communication within the computing device 600 and between the computing device 600 and a communication bus (e.g., any of the communication buses 302, 402, 404, 502) of the vehicle 100, 200. The hardware may include transmitters, receivers, and antennas, for example.

The communication interface 604 may be a wireless interface and/or one or more wireline interfaces that allow for both short-range communication and long-range communication to one or more networks or to one or more remote devices (e.g., to allow communication with any of the communication buses 302, 402, 404, 502). Such wireless interfaces may provide for communication under one or more wireless communication protocols, Bluetooth, Wi-Fi (e.g., an institute of electrical and electronic engineers (IEEE) 802.11 protocol), Long-Term Evolution (LTE), cellular communications, near-field communication (NFC), and/or other wireless communication protocols. Wireline interfaces may include an Ethernet interface, a CAN network interface, a USB interface, or similar interface to communicate via a wire, a twisted pair of wires, a coaxial cable, an optical link, a fiber-optic link, or other physical connection to a wireline network. Thus, the communication interface 604 may be configured to receive input data from any of the communication buses 302, 402, 404, 502, and may be configured to send output data to any of the communication buses 302, 402, 404, 502.

The data storage 606 may include or take the form of one or more computer-readable storage media that can be read or accessed by the processor(s) 602. The computer-readable storage media can include volatile and/or non-volatile storage components, such as optical, magnetic, organic or other memory or disc storage, which can be integrated in whole or in part with the processor(s) 602. The data storage 606 is considered non-transitory computer readable media. In some examples, the data storage 606 can be implemented using a single physical device (e.g., one optical, magnetic, organic or other memory or disc storage unit), while in other examples, the data storage 606 can be implemented using two or more physical devices.

The data storage 606 thus is a non-transitory computer readable storage medium, and executable instructions 614 are stored thereon. The executable instructions 614 include computer executable code. When the executable instructions 614 are executed by the processor(s) 602, the processor(s) 602 are caused to perform operations of the computing device 600 (e.g., operations performed by any of the devices, modules, sensors described above).

The processor(s) 602 may be a general-purpose processor or a special purpose processor (e.g., digital signal processors, application-specific integrated circuits (ASIC), etc.). The processor(s) 602 may receive inputs from the communication interface 604, and process the inputs to generate outputs that are stored in the data storage 606. The processor(s) 602 can be configured to execute the executable instructions 614 (e.g., computer-readable program instructions) that are stored in the data storage 606 and are executable to provide the functionality of the computing device 600 described herein.

If the computing device 600 represents the display device 328, the computing device 600 can further include an output interface 608 and a display 610. The output interface 608 outputs information to the display 610 or to other components as well. Thus, the output interface 608 can be a wireless interface (e.g., transmitter) or a wired interface as well. The processor(s) 602 may receive inputs from the communication interface 604, and process the inputs to generate outputs to the display 610.

FIG. 7 is a flowchart of a method 700, according to an example implementation. The method 700 relates to connecting or communicatively coupling components of the control system 400, 500 or components of the vehicle 100, 200, for example.

The method 700 may include one or more operations, or actions as illustrated by one or more of blocks 702-704. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 700 and other processes and operations disclosed herein, the flowchart shows operation of one possible implementation of present examples. In this regard, each block may represent a module, a segment, or a portion of program code, which includes one or more instructions executable by a processor (e.g., the processor(s) 602 of the computing device 600) for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 700 and other processes and operations disclosed herein, one or more blocks in FIG. 7 may represent circuitry or digital logic that is arranged to perform the specific logical operations in the process.

At block 702, the method 700 includes communicatively coupling at least one drive motor controller (e.g., one or both of the drive motor controllers 304, 306) to: (i) a first communication bus (e.g., the communication bus 302) of a first communication network of the vehicle 100, 200, and (ii) a second communication bus (e.g., the communication bus 402, 404 and/or the communication bus 502) of a second network of the vehicle 100, 200, wherein the second communication bus is independent from the first communication bus.

At block 704, the method 700 includes communicatively coupling at least one drive input device (e.g., one or both of the drive input devices 303, 305), which commands movement of the vehicle 100, 200, to the at least one drive motor controller via the second communication bus such that a command from the at least one drive input device to the at least one drive motor controller is independent and isolated from the first communication network.

The method 700 can further include any of the steps related to connections of the control system 400, 500 or the devices thereof as described throughout herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to those with skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A control system for a vehicle, the control system comprising:
a first communication network having a first communication bus;
a second communication network having a second communication bus, independent from the first communication bus;
a plurality of devices that are communicatively coupled to the first communication bus such that each device of the plurality of devices is in direct communication with other devices of the plurality of devices, wherein the plurality of devices include: at least one drive motor controller of an electric motor that drives the vehicle, wherein the at least one drive motor controller is communicatively coupled to the first communication bus and the second communication bus; and
at least one drive input device that commands movement of the vehicle, wherein the at least one drive input device is communicatively coupled directly to the at least one drive motor controller via the second communication bus such that a command from the at least one drive input device to the at least one drive motor controller is independent and isolated from the first communication network.

2. The control system of claim 1, wherein the plurality of devices further comprise:
a display device connected to the first communication bus only and configured to display information received via the first communication bus from the plurality of devices including the at least one drive motor controller.

3. The control system of claim 1, wherein the plurality of devices further comprise:
a display device connected to both the first communication bus and the second communication bus, wherein the display device is configured to display information received via the first communication bus and the second communication bus.

4. The control system of claim 1, wherein the at least one drive motor controller comprises:
a first drive motor controller controlling a first electric motor driving a first wheel or track of the vehicle; and
a second drive motor controller controlling a second electric motor driving a second wheel or track of the vehicle.

5. The control system of claim 4, wherein the first drive motor controller is communicatively coupled to the second drive motor controller via the first communication bus only.

6. The control system of claim 4, wherein the first drive motor controller is communicatively coupled to the second drive motor controller via both the first communication bus and the second communication bus.

7. The control system of claim 4, wherein the at least one drive input device includes (i) a first drive input device communicatively coupled directly to the first drive motor controller via the second communication bus, and (ii) a second drive input device communicatively coupled directly to the second drive motor controller via the second communication bus.

8. The control system of claim 4, further comprising:
a third communication network having a third communication bus, independent from the first communication bus and the second communication bus, wherein the at least one drive input device includes (i) a first drive input device communicatively coupled directly to the first drive motor controller via the second communication bus, and (ii) a second drive input device communicatively coupled directly to the second drive motor controller via the third communication bus.

9. A vehicle comprising:
a first wheel or track;
a second wheel or track;
a first communication network having a first communication bus;
a second communication network having a second communication bus, independent from the first communication bus;
at least one drive motor controller configured to control at least one electric motor that propels the first wheel or track and the second wheel or track, wherein the at least one drive motor controller is communicatively coupled to the first communication bus and the second communication bus; and
at least one drive input device operated by an operator of the vehicle to command movement of the vehicle, wherein the at least one drive input device is communicatively coupled directly to the at least one drive motor controller via the second communication bus such that a command from the at least one drive input device to the at least one drive motor controller is independent and isolated from the first communication network.

10. The vehicle of claim 9, further comprising:
a display device connected to the first communication bus only and configured to display information received via the first communication bus from the at least one drive motor controller.

11. The vehicle of claim 9, further comprising:
a display device connected to both the first communication bus and the second communication bus, wherein the display device is configured to display information received via both the first communication bus and the second communication bus.

12. The vehicle of claim 9, wherein the at least one drive motor controller comprises:
a first drive motor controller controlling a first electric motor driving the first wheel or track; and
a second drive motor controller controlling a second electric motor driving the second wheel or track of the vehicle.

13. The vehicle of claim 12, wherein the first drive motor controller is communicatively coupled to the second drive motor controller via the first communication bus only.

14. The vehicle of claim 12, wherein the first drive motor controller is communicatively coupled to the second drive motor controller via both the first communication bus and the second communication bus.

15. The vehicle of claim 12, wherein the at least one drive input device includes (i) a first drive input device communicatively coupled directly to the first drive motor controller via the second communication bus, and (ii) a second drive input device communicatively coupled directly to the second drive motor controller via the second communication bus.

16. The vehicle of claim 12, further comprising:
a third communication network having a third communication bus, independent from the first communication bus and the second communication bus, wherein the at least one drive input device includes (i) a first drive input device communicatively coupled directly to the first drive motor controller via the second communication bus, and (ii) a second drive input device communicatively coupled directly to the second drive motor controller via the third communication bus.

17. A method comprising:

communicatively coupling at least one drive motor controller to: (i) a first communication bus of a first communication network of a vehicle, and (ii) a second communication bus of a second network of the vehicle, wherein the second communication bus is independent from the first communication bus; and communicatively coupling at least one drive input device, which commands movement of the vehicle, to the at least one drive motor controller via the second communication bus such that a command from the at least one drive input device to the at least one drive motor controller is independent and isolated from the first communication network.

18. The method of claim 17, wherein the at least one drive motor controller comprises: (i) a first drive motor controller controlling a first electric motor driving a first wheel or track of the vehicle, and (ii) a second drive motor controller controlling a second electric motor driving a second wheel or track of the vehicle, and wherein the method further comprises:

communicatively coupling the first drive motor controller to the second drive motor controller via the first communication bus only; or communicatively coupling the first drive motor controller to the second drive motor controller via both the first communication bus and the second communication bus.

19. The method of claim 17, wherein the at least one drive motor controller comprises (i) a first drive motor controller controlling a first electric motor driving a first wheel or track of the vehicle, and (ii) a second drive motor controller controlling a second electric motor driving a second wheel or track of the vehicle, wherein the at least one drive input device comprises: (i) a first drive input device, and (ii) a second drive input device, and wherein the method further comprises:

communicatively coupling the first drive input device directly to the first drive motor controller via the second communication bus; and communicatively coupling the second drive input device directly to the second drive motor controller via the second communication bus.

20. The method of claim 17, wherein the vehicle further comprises a third communication network having a third communication bus, independent from the first communication bus and the second communication bus, wherein the at least one drive motor controller comprises (i) a first drive motor controller controlling a first electric motor driving a first wheel or track of the vehicle, and (ii) a second drive motor controller controlling a second electric motor driving a second wheel or track of the vehicle, wherein the at least one drive input device includes (i) a first drive input device, and (ii) a second drive input device, wherein the method further comprises:

communicatively coupling the first drive input device directly to the first drive motor controller via the second communication bus; and communicatively coupling the second drive input device directly to the second drive motor controller via the third communication bus.

* * * * *